US012668903B2

(12) United States Patent
Taniguchi et al.

(10) Patent No.: US 12,668,903 B2
(45) Date of Patent: Jun. 30, 2026

(54) THREE-DIMENSIONAL NETWORK STRUCTURE

(71) Applicant: TOYOBO MC CORPORATION, Osaka (JP)

(72) Inventors: Keisuke Taniguchi, Otsu (JP); Shinichi Kobuchi, Osaka (JP)

(73) Assignee: TOYOBO MC CORPORATION, Osaka (JP)

( * ) Notice: Subject to any disclaimer, the term of this patent is extended or adjusted under 35 U.S.C. 154(b) by 230 days.

(21) Appl. No.: 18/284,120

(22) PCT Filed: Mar. 22, 2022

(86) PCT No.: PCT/JP2022/013262
§ 371 (c)(1),
(2) Date: Sep. 26, 2023

(87) PCT Pub. No.: WO2022/210123
PCT Pub. Date: Oct. 6, 2022

(65) Prior Publication Data
US 2024/0158967 A1 May 16, 2024

(30) Foreign Application Priority Data
Mar. 31, 2021 (JP) ................................. 2021-061679

(51) Int. Cl.
| *D04H 3/011* | (2012.01) |
| *C08G 63/672* | (2006.01) |
| *C08K 3/40* | (2006.01) |
| *D04H 3/16* | (2006.01) |

(52) U.S. Cl.
CPC ........... *D04H 3/011* (2013.01); *C08G 63/672* (2013.01); *C08K 3/40* (2013.01); *D04H 3/16* (2013.01); *D10B 2401/02* (2013.01)

(58) Field of Classification Search
CPC ........ D04H 3/011; D04H 3/16; C08G 63/672; C08K 3/40; D10B 2401/02
See application file for complete search history.

(56) References Cited

U.S. PATENT DOCUMENTS

| 5,639,543 | A | 6/1997 | Isoda et al. |
| 2001/0023156 | A1 | 9/2001 | Nomura |
| 2004/0002416 | A1 | 1/2004 | Nomura |
| 2004/0002417 | A1 | 1/2004 | Nomura |
| 2007/0112115 | A1 | 5/2007 | Shalaby et al. |
| 2012/0184166 | A1 | 7/2012 | Kurihara et al. |
| 2016/0251790 | A1 | 9/2016 | Wakui et al. |
| 2020/0199010 | A1* | 6/2020 | Fu ............................. C03C 3/21 |

FOREIGN PATENT DOCUMENTS

| JP | 52-111955 | A | | 9/1977 |
| JP | 7-68061 | A | | 3/1995 |
| JP | H0848539 | A | * | 2/1996 | ............... C03C 3/16 |
| JP | H11100228 | A | | 4/1999 |
| JP | 2001-26439 | A | | 1/2001 |
| JP | 2001-64524 | A | | 3/2001 |
| JP | 2001-247333 | A | | 9/2001 |
| JP | 2003-48807 | A | | 2/2003 |
| JP | 2007-84450 | A | | 4/2007 |
| JP | 2011-63680 | A | | 3/2011 |
| JP | 2015-84790 | A | | 5/2015 |
| WO | 2017/065260 | A1 | | 4/2017 |

OTHER PUBLICATIONS

English translation of WO 2017065260 A1 to Wakui et al. obtained from PE2E database (Year: 2017).*
English translation of JP 2007084450 A to Endo et al. obtained from PE2E database (Year: 2007).*
English translation of JP 2001064524 A to Motomura et al. obtained from PE2E database (Year: 2001).*
English translation of JP H0848539 A to Nagashima et al. obtained from PE2E database (Year: 1996).*
Office Action dated Jan. 22, 2025, issued in counterpart TW Application No. 111110720, with English translation. (11 pages).
Extended Supplementary European Search Report dated Feb. 26, 2025, issued in counterpart Application No. 22780338.4. (7 pages).
International Search Report dated May 31, 2022, issued in counterpart International Application No. PCT/JP2022/013262. (3 pages).
Office Action dated Apr. 24, 2025, issued in counterpart CN Application No. 202280026075.X, with English translation. (9 pages).
Office Action dated Sep. 9, 2025, issued in counterpart JP Application No. 2023-511035, with English translation. (6 pages).
Office Action dated Sep. 18, 2025, issued in counterpart CN Application No. 202280026075.X, with English translation. (10 pages).
Office Action dated Jan. 13, 2026, issued in counterpart CN Application No. 202280026075.X, with English translation. (10 pages).

* cited by examiner

*Primary Examiner* — Jeremy R Pierce
(74) *Attorney, Agent, or Firm* — WHDA, LLP

(57) ABSTRACT

An object of the present invention is to provide a three-dimensional network structure which has high hydrolysis resistance and thus degradation of resin due to moisture in the air is prevented in long-term use. The three-dimensional network structure includes a three-dimensional random loop shaped and bonded structure including a linear continuous fiber, wherein the linear continuous fiber includes a resin composition, and the resin composition includes a polyester-based thermoplastic elastomer and a phosphate glass. The phosphate glass preferably contains $P_2O_5$, $SiO_2$, $ZnO$, and at least one selected from the group consisting of an alkali metal oxide and an alkaline earth metal.

3 Claims, No Drawings

THREE-DIMENSIONAL NETWORK STRUCTURE

TECHNICAL FIELD

The present invention relates to a three-dimensional network structure suitable for a cushion material of office chairs, furniture, sofas, bedding such as beds, seats of vehicles such as trains, automobiles, two-wheeled vehicles, child safety seats, and baby buggies, shock-absorbing mats such as floor mats and members for preventing collision and nipping.

BACKGROUND ART

Currently, "foamed-crosslinked type urethanes" are widely used as cushion materials for furniture, bedding such as beds, seats of vehicles such as trains, automobiles, and two-wheeled vehicles from the view points of high durability and processability. However, "foamed-crosslinked type urethanes" are inferior in moisture permeability, water permeability, and air permeability. In addition, the heat storage capacity of foamed-crosslinked type urethanes is a cause of stuffiness. Further, since "foamed-crosslinked type urethanes" are non-thermoplastic, recycling of them are difficult. It is pointed out that, when foamed-crosslinked type urethanes are incinerated, great damage is given to an incinerator and also it costs money for removal of generated toxic gases. Due to above reasons, unnecessary "foamed-crosslinked type urethanes" are often disposed of in a landfill site. However, difficulty in stabilization of landfilled ground limits sites for landfilling, leading to a problem that landfilling becomes more costly. In addition, it is also pointed out that chemicals used in the urethane production cause pollution problems, and also problems arise from residual chemicals after foaming and associated offensive odors.

In Patent Document 1, the three-dimensional network structure, which is formed from continuous fibers of thermoplastic resin composition and has bonded conformation of three-dimensional random loop shaped fibers, is disclosed. Such a structure can solve problems originating from "foamed-crosslinked type urethanes" and also has high cushioning property. However, the three-dimensional network structure needs to be improved in the following point. In an application of the product in bedding and seats of vehicles, long-term exposure of the structure to moisture in the air causes hydrolysis, resulting in degradation of the resin composition forming the structure.

The three-dimensional network structure disclosed in Patent Document 2 shows excellent hydrolysis resistance when heated to high temperature or remelted. According to the Patent Document, the thermoplastic elastomer has lowered acid valued, thereby enabling the three-dimensional network structure to have hydrolysis resistance in a thermal processing step including heating to high temperature near melting point or a re-melting step for recycling. However, when the three-dimensional network structure is used as a product, hydrolysis of resin due to long-term exposure to moisture in the air is not sufficiently prevented, and improvement is needed to reduce degradation of resin composition forming the three-dimensional network structure.

CITATION LIST

Patent Documents

Patent Document 1: Japanese Laid-open Patent Publication No. 07-68061

Patent Document 2: International Publication WO 2017/065260

SUMMARY OF THE INVENTION

Problems to be Solved by the Invention

The present invention has been done in view of the problems of the background art described above, and it is an object of the present invention to provide a three-dimensional network structure having high hydrolysis resistance.

Solution to the Problems

One or more embodiments of the present invention, which can solve above problems, are as follows.
  [1] A three-dimensional network structure comprising a three-dimensional random loop shaped and bonded structure comprising a linear continuous fiber, wherein the linear continuous fiber comprises a resin composition, and the resin composition comprises a polyester-based thermoplastic elastomer and a phosphate glass.
  [2] The three-dimensional network structure according to [1], wherein the phosphate glass contains $P_2O_5$, $SiO_2$, ZnO, and at least one selected from the group consisting of an alkali metal oxide and an alkaline earth metal.

Advantageous Effects of the Invention

The three-dimensional network structure of the present invention includes a polyester-based thermoplastic elastomer resin composition having high hydrolysis resistance; therefore, the three-dimensional network structure has a characteristic of resistance to deterioration caused by moisture in the air during long-term use.

DESCRIPTION OF EMBODIMENTS

Hereinafter, the present invention may be described in detail.

The three-dimensional network structure of the present invention is formed from a resin composition including a polyester-based thermoplastic elastomer and phosphate glass.

When the three-dimensional network structure of the present invention is exposed to moisture in the air, phosphorus as a component of phosphate glass in the resin composition is dissolved in the moisture, and the moisture consumption prevents hydrolysis of the polyester-based thermoplastic elastomer resin composition.

Next, phosphate glass will be described.

Phosphate glass is composite glass containing phosphorus pentoxide ($P_2O_5$) as a network forming oxide, and when the composite glass contains three types of network forming oxides of diboron trioxide ($B_2O_3$), silicon dioxide ($SiO_2$), and diphosphorus pentoxide ($P_2O_5$), the phosphorus pentoxide ($P_2O_5$) has highest content among the three types of network forming oxides. Specifically, the phosphate glass is exemplified with composite glass containing $P_2O_5$, $SiO_2$, ZnO, and at least one selected from the group consisting of an alkali metal oxide and an alkaline earth metal. Examples of the alkali metal oxide include $K_2O$, $Na_2O$, and $Li_2O$. Examples of the alkaline earth metal oxide include MgO and CaO. In addition, the composite glass may further contain $Ag_2O$, $GeO_2$, $BeF_2$, $As_2S_3$, CuO, $TiO_2$, $LaO_3$, $ZrO_2$, $MoO_3$, and/or $GeS_2$ as far as the characteristics of it are not degraded.

Phosphate glass contains $P_2O_5$ in relatively high amount. For effective prevention of hydrolysis of the polyester-based thermoplastic elastomer, the molar ratio of phosphorus atoms to silicon atoms (P/Si) in the phosphate glass is preferably 1 or more, more preferably 5 or more, further preferably 8 or more, and particularly preferably 10 or more. In case where the molar ratio (P/Si) is smaller than 1, the phosphate glass may have decreased boron elution rate to moisture, and prevention efficiency of hydrolysis may be lowered. Further, the content of phosphate glass in the three-dimensional network structure needs to be high, otherwise, prevention efficiency of hydrolysis may be lowered.

The molar ratio (P/Si) of the phosphate glass is preferably 20 or less, more preferably 18 or less, and particularly preferably 15 or less from the viewpoint of heat resistance and chemical durability.

The phosphate glass having such a composition is exemplified with the phosphate glass containing $P_2O_5$ in an amount of from 20 to 60 mol % and $SiO_2$ in an amount of from 1 to 30 mol %. The phosphate glass may have polyhedral or spherical shape, and may be in the form of, for example, fine powder, frit, particles, or beads. In case where the phosphate glass has a polyhedral or spherical shape, the average particle diameter of it is preferably 0.1 μm or more, more preferably 0.5 μm or more, and particularly preferably 1 μm or more from the viewpoint of preventing the generation of secondary agglomeration and the cost of milling during spinning.

Further, in case where the phosphate glass has a polyhedral or spherical shape, the average particle diameter of the phosphate glass is preferably 100 μm or less, more preferably 50 μm or less, and particularly preferably 30 μm or less from the viewpoint of preventing a rise in back pressure during spinning.

In general, for example, phosphate glass is produced by the following melting and crushing method. Raw materials such as $P_2O_5$, $SiO_2$, and an alkali metal oxide are mixed at a predetermined composition ratio and melted at high temperature, then the melt is rapidly cooled to form glass fragments, and crushed with a ball mill.

Such phosphate glass is available from, for example, Nippon Electric Glass Co., Ltd., Nippon Frit Co., Ltd., ISHIZUKA GLASS CO., LTD., KOA GLASS CO., LTD., TOAGOSEI CO., LTD., Toyo Glass Co., Ltd., and Potters-Ballotini Co., Ltd, but sellers are not limited to them.

The three-dimensional network structure of one or more embodiments of the present invention preferably contains phosphorus originating from phosphate glass in an amount of 5 ppm or more on a mass basis. When the three-dimensional network structure contains phosphorus originating from phosphate glass in an amount of 5 ppm or more on a mass basis, the phosphorus contained in the phosphate glass is dissolved in moisture in the air contacting with the glass, and hydrolysis of resin composition caused by the moisture is prevented due to consumption of the moisture.

The content of the phosphorus originating from phosphate glass in the three-dimensional network structure is preferably 10 ppm or more, more preferably 15 ppm or more, particularly preferably 150 ppm or more, and most preferably 400 ppm or more on a mass basis for prevention efficiency of hydrolysis of the resin composition by moisture in the air. Further, the phosphate glass may contain silver oxide, copper oxide, and/or zinc oxide, and thus may prevent bacterial growth on fibers of the three-dimensional network structure effectively.

On the other hand, excessive content of phosphorus originating from phosphate glass in the three-dimensional network structure may cause fragility of the continuous fiber forming the three-dimensional network structure to be fragile, and thus may cause deterioration in mechanical properties (for example dynamic durability) of the three-dimensional network structure. Therefore, the content of phosphorus originating from phosphate glass in the three-dimensional network structure is preferably 36000 ppm or less, more preferably 18000 ppm or less, further preferably 10000 ppm or less, particularly preferably 5000 ppm or less, and most preferably 2500 ppm or less on a mass basis, to reduce the risk of deterioration in mechanical properties of the three-dimensional network structure.

Next, the polyester-based thermoplastic elastomer used in one or more embodiments of the present invention will be described.

The polyester-based thermoplastic elastomer is exemplified with a polyester-ether block copolymer having a thermoplastic polyester as a hard segment and a polyalkylene diol as a soft segment, or a polyester-ester block copolymer having a thermoplastic polyester as a hard segment and an aliphatic polyester as a soft segment.

Examples of the polyester-ether block copolymer include a triblock copolymer formed of at least one of dicarboxylic acids selected from aromatic dicarboxylic acids such as terephthalic acid, isophthalic acid, naphthalene-2,6-dicarboxylic acid, naphthalane-2,7-dicarboxylic acid and diphenyl-4,4'-dicarboxylic acid, cycloaliphatic dicarboxylic acids such as 1,4-cyclohexanedicarboxylic acid, aliphatic dicarboxylic acids such as succinic acid, adipic acid, sebacic acid and dimer acid and ester forming derivatives thereof; at least one of diol components selected from aliphatic diols such as 1,4-butanediol, ethylene glycol, trimethylene glycol, tetramethylene glycol, pentamethylene glycol and hexamethylene glycol and cycloaliphatic diols such as 1,1-cyclohexanedimethanol, 1,4-cyclohexanedimethanol and ester forming derivatives thereof; and at least one of polyalkylenediols having the number average molecular weight of about 300 or more and 5000 or less such as glycols including polyethylene glycol, polypropylene glycol, polytetramethylene glycol or an ethylene oxide-propylene oxide copolymer.

The polyester-ester block copolymer is exemplified with a triblock copolymer formed of at least one of the above-described dicarboxylic acids, at least one of the above-described diols, and at least one of polyester diols such as polylactone having the number average molecular weight of about 300 or more and 5000 or less. Considering of heat adhesiveness, hydrolysis resistance, stretchability, and heat resistance, a triblock copolymer having terephthalic acid and/or naphthalene-2,6-dicarboxylic acid as a dicarboxylic acid, 1,4-butanediol as a diol component, and polylactone as a polyester diol, or a triblock copolymer having polytetramethylene glycol as a polyalkylenediol are especially preferred. In special cases, those containing a polysiloxane-based soft segment may also be used.

Further, the polyester-based thermoplastic elastomer of one or more embodiments of the present invention also includes those obtained by blending or copolymerizing a non-elastomer component with the polyester-based thermoplastic elastomer and those having a polyolefin-based component as a soft segment. Further, the polyester-based thermoplastic elastomer also includes those obtained by adding various additives, if needed, to the polyester-based thermoplastic elastomer.

The polyester-based thermoplastic elastomer including phosphate glass can be obtained, for example, as follows.

The polyester-based thermoplastic elastomer is polymerized by a conventional method and then pelletized once. The obtained pellets of the polyester-based thermoplastic elastomer are mixed with fine powder of the phosphate glass at a predetermined blending ratio. Then, the mixture is melt extruded from a twin-screw extruder, cooled, pelletized, and dried to obtain the resin composition of the polyester-based thermoplastic elastomer including phosphate glass.

Alternatively, fine powder of the phosphate glass can be supplied at a predetermined blending ratio from a side feeder mounted to an extruder while the pellets of the polyester-based thermoplastic elastomer is being melt extruded from a twin-screw extruder. The polyester-based thermoplastic elastomer and the phosphate glass are then melt extruded while being kneaded and mixed in the extruder. Then, after cooling, pelletizing, and drying, the resin composition of the polyester-based thermoplastic elastomer including the phosphate glass is obtained.

The phosphate glass is added in an amount preferably ranging from 0.001 to 50% by mass with respect to 100% by mass of the resin composition. When the amount of added phosphate glass is less than 0.001% by mass, unevenness of the content of phosphate glass in the resin composition may be increased. When the amount of added phosphate glass is more than 50% by mass, such a large content of phosphate glass may make the production of the resin composition difficult. The amount of added phosphate glass is preferably from 0.01 to 20% by mass due to unevenness of content and the ease of production of the resin composition.

In the production of the resin composition, an antioxidant may be preferably blended to prevent thermal degradation of the resin composition during melt spinning and thermoforming of the three-dimensional network structure, and also to prevent light-induced deterioration. The amount of an antioxidant added is preferably 0.05% by mass or more, more preferably 0.10% by mass or more, particularly preferably 0.20% by mass or more, and most preferably 0.50% by mass or more with respect to 100% by mass of the resin composition.

The antioxidant is exemplified with known phenol-based antioxidant, phosphorus-type antioxidant, or thioether-based antioxidant. The antioxidant may be used in combination with benzotriazole-based UV absorber, triazine-based UV absorber, benzophenone-based UV absorber, N—H type hindered amine-based light stabilizer, or N—CH₃ type hindered amine-based light stabilizer. The resin composition may preferably contain at least one of the additives.

Examples of the phenol-based antioxidant include 1,3,5-tris[[3,5-bis(1,1-dimethylethyl)-4-hydroxyphenyl]methyl]-1,3,5-triazine-2,4,6(1H,3H,5H)-trione, 1,1,3-tris(2-methyl-4-hydroxy-5-tert-butylphenyl)butane, 4,4'-butylidenebis(6-tert-butyl-m-cresol), 3-(3,5-di-tert-butyl-4-hydroxyphenyl) propionic acid stearyl, pentaerythritol tetrakis[3-(3,5-di-tert-butyl-4-hydroxyphenyl)propionate], Sumilizer G 80, and 2,4,6-tris(3',5'-di-tert-butyl-4'-hydroxybenzyl)mesitylene.

Examples of the phosphorus-type antioxidant include 3,9-bis(octadecyloxy)-2,4,8,10-tetraoxa-3,9-diphosphaspiro [5,5]undecane, 3,9-bis(2,6-di-tert-butyl-4-methylphenoxy-2,4,8,10-tetraoxa-3,9-diphosphaspiro[5,5]undecane, 2,4,8,10-tetrakis(1,1-dimethylethyl)-6-[(2-ethylhexyl)oxy]-12H-dibenzo[d,g][1,3,2]dioxaphosphocin, tris(2,4-di-tert-butylphenyl)phosphite, tris(4-nonylphenyl)phosphite, 4,4'-isopropylidenediphenol $C_{12-15}$ alcohol phosphite, diphenyl (2-ethylhexyl)phosphite, diphenyl isodecyl phosphite, triisodecyl phosphite, and triphenyl phosphite.

Examples of the thioether-based antioxidant include bis [3-(dodecylthio)propionate]2,2-bis[[3-(dodecylthio)-1-oxo-propyloxy]methyl]-1,3-propanediyl and 3,3'-ditridecyl thiobispropionate.

In addition to an antioxidant, a UV absorber, and a light stabilizer, the resin composition may contain various additives depending on purposes. Examples of the additives include phthalate ester-based, trimellitate ester-based, aliphatic acid-based, epoxy-based, adipate ester-based, polyester-based, and other plasticizers; antistatic agents; molecular weight modifiers such as peroxides; compounds having a reactive group such as epoxy-based compounds, isocyanate-based compounds, and carbodiimide-based compounds; metal deactivators; organic and inorganic nucleating agents; neutralizers; antacids; antimicrobial agents; fluorescent whiteners; fillers; flame retardants; flame retardant auxiliaries; and organic and inorganic pigments.

The three-dimensional network structure of one or more embodiments of the present invention is the network structure having spatial structure formed through spatial bonding of the random loop shaped continuous fibers including the resin composition of the polyester-based thermoplastic elastomer containing phosphate glass.

The continuous fiber forming the three-dimensional network structure of one or more embodiments of the present invention may be a complex fiber including other thermoplastic resins to the extent not impairing the effect of one or more embodiments of the present invention. The continuous linear body may be formed to a complex fiber in the form of, for example, a sheath-core type, a side-by-side type, or an eccentric sheath-core type. In case where the complex fiber is a sheath-core type, phosphate glass may be contained in both of the sheath component and the core component, or phosphate glass may be contained only in the sheath component.

The three-dimensional network structure of one or more embodiments of the present invention can be produced by a known method described in Japanese Patent Laid-Open No. H7-68061. For example, the resin composition of thermoplastic elastomer including phosphate glass is distributed from a multi-row nozzle having a plurality of orifices to another nozzle having orifices, and then discharged downward from the nozzle as a continuous fiber at a spinning temperature which is melting point +20° C. or higher and lower than melting point +120° C. Then, a three-dimensional structure is formed by bringing continuous linear bodies into contact with each other in a melt state and fusing contact portions thereof. The structure is sandwiched at both faces with take-up conveyors each equipped with a net, and cooled with cooling water in a cooling tank. After that, the solidified spatial network structure is drawn, then drained or dried, and the spatial network structure having two or one smoothed side can be obtained. In case where only one surface needs to be smoothed, continuous linear bodies are discharged on an inclined take-up net, and the linear bodies are contacted with each other and fused at contact portions thereof in a melt state. While the spatial network structure is being formed, the shape only on the take-up net touching side of the structure may be loosened and the structure may be cooled. Thus obtained three-dimensional network structure can be subjected to an annealing treatment. The three-dimensional network structure may be subjected to a drying treatment instead of an annealing treatment.

The cross sectional shape of the continuous fiber forming the three-dimensional network structure of one or more embodiments of the present invention is not particularly limited. A hollow cross-section and a modified cross-section can provide desirable compression resistance and touch.

The three-dimensional network structure may have a region mainly including relatively fine fibers in fiber diameter, a region mainly including relatively thick fibers in fiber diameter, and an intermediate mixed region, which is positioned between the two regions, including both of thick and fine fibers.

The three-dimensional network structure of one or more embodiments of the present invention may have the following functions, to the extent not reducing performance thereof. The functions are exemplified with a deodorant and antibacterial property, an anti-odor property, an antifungal property, a coloring property, an aromatic property, a flame-retardant property, and a moisture absorbing/releasing property. These functions may be provided by dipping treatment in which chemicals are applied in any process from a production process of the resin to a process to form molded body for productization.

The three-dimensional network structure of one or more embodiments of the present invention may include a laminated structure as far as the purpose of one or more embodiments of the present invention is not impaired. The laminated structure may have top and back surface layers in which each surface layer includes a linear fiber having different finesse, or top and back surface layers in which each surface layer has different apparent density. Examples of the method for forming a laminated structure include a method for mutually stacking layers for a three-dimensional network structure and fixing them with a side ground, a method for fusing and fixing the layers by heating, a method for bonding the layers with an adhesive, and a method for binding the layers by sewing or using a band.

The three-dimensional network structure of one or more embodiments of the present invention has high retention rate of reduced viscosity after heat treatment. The reduced viscosity $\eta sp/c$ is given by the formula of $\{(\eta-\eta0)/\eta0\}/c$, where $\eta$ indicates a coefficient of viscosity of polymer solution, $\eta0$ indicates a coefficient of viscosity of solvent, and c indicates concentration of solute macromolecules in polymer solution. The retention rate of reduced viscosity provides a measure for relative comparison of molecular weights of polymers.

For example, when the polyester-based thermoplastic elastomer has lowered molecular weight due to hydrolysis, the reduced viscosity after hydrolysis of polyester-based thermoplastic elastomer resin composition may become smaller than the reduced viscosity before hydrolysis of polyester-based thermoplastic elastomer resin composition.

Therefore, the resistance to hydrolysis caused by long-term exposure to moisture in the air can be evaluated from changes in reduced viscosity after an accelerated aging test. That is, hydrolysis resistance can be evaluated by heat treating the three-dimensional network structure under high temperature and humidity and then by comparing the reduced viscosity before and after the treatment of resin composition forming the three-dimensional network structure.

The retention rate of reduced viscosity after heat treatment is represented by the following equation (1), where A indicates reduced viscosity of the resin composition forming the three-dimensional network structure and B indicates reduced viscosity of the resin composition forming the three-dimensional network structure after heat treatment under an atmosphere of a temperature of 80° C. and a relative humidity of 90 RH % for 240 hours.

$$\text{Retention rate of reduced viscosity after heat treatment} = (B/A) \times 100 \qquad (1)$$

With a higher retention rate of reduced viscosity after heat treatment, a decrease in molecular weight after heat treatment lowers, in other words, the three-dimensional network structure has high hydrolysis resistance. This means than the retention rate of reduced viscosity after heat treatment is an index to evaluate hydrolysis resistance of the three-dimensional network structure in one or more embodiments of the present invention.

The three-dimensional network structure of one or more embodiments of the present invention has a retention rate of reduced viscosity after heat treatment of preferably 65% or more. When the three-dimensional network structure has the retention rate of reduced viscosity after heat treatment of 65% or more, hydrolysis due to long-term exposure to moisture in the air barely occurs, in other words, the three-dimensional network structure has high hydrolysis resistance. The retention rate of reduced viscosity after heat treatment is more preferably 70% or more, further preferably 75% or more, particularly preferably 80% or more, and most preferably 85% or more from the viewpoint of hydrolysis resistance.

The three-dimensional network structure of one or more embodiments of the present invention has a thickness of preferably 10 mm or more, and more preferably 20 mm or more. The thickness of less than 10 mm may become a cause of bottom touching feeling when the three-dimensional network structure is used as a material for cushion. The upper limit of the thickness is preferably 300 mm or less, more preferably 200 mm or less, and further preferably 120 mm or less due to manufacturing device.

The three-dimensional network structure of one or more embodiments of the present invention has an apparent density of preferably 0.005 g/cm³ or more and 0.20 g/cm³ or less, more preferably 0.01 g/cm³ or more and 0.18 g/cm³ or less, and further preferably 0.02 g/cm³ or more and 0.15 g/cm³ or less. The apparent density of less than 0.005 g/cm³ may cause required hardness not to be retained when used as a material for cushion. The apparent density of more than 0.20 g/cm³ may cause the structure to be too hard as a material for cushion.

With regard to the fiber diameter of the continuous fiber forming the three-dimensional network structure of one or more embodiments of the present invention, a small fiber diameter may lead to insufficient hardness as a cushion material. In contrast, too large fiber diameter may cause extensive hardness as a cushion material depending on the purposes of cushions. Therefore, the fiber diameter should preferably be determined to an appropriate range depending on the purposes of the cushions. The fiber diameter is preferably 0.1 mm or more, and more preferably 0.2 mm or more. The fiber diameter of less than 0.1 mm may improve fineness and soft touch feeling, however, such a diameter may cause a difficulty in keeping hardness required as a network structure. In contrast, the fiber diameter is preferably 3.0 mm or less, and more preferably 2.5 mm or less. In case where the fiber diameter is more than 3.0 mm, the three-dimensional network structure may have sufficient hardness, however, the network structure may be rough, resulting in inferior cushioning property.

(Effect)

The three-dimensional network structure of one or more embodiments of the present invention has high hydrolysis resistance and thus degradation of resin due to moisture in the air is prevented in long-term use; therefore, the structure has excellent durability in long-term use.

EXAMPLES

Hereinafter, the present invention will be specifically described with Examples, but the present invention is not limited by the Examples. In Examples, characteristic values were measured and evaluated as follows.

(1) Reduced Viscosity

[Preparation of Test Solution]

In a hot air drier with an inner temperature set to 70° C., a pellet or a three-dimensional network structure to be tested was placed and allowed to stand for 25 minutes to be dried. The dried pellet or a three-dimensional network structure was cut into small pieces each having a length within 2 mm. The sample was weighed to 0.08±0.003 g, and a mixed solvent of phenol/1,1,2,2-tetrachloroethane (60/40: mass ratio) was added with an accuracy of ±0.01 ml to the sample, to obtain a solution with a concentration of 0.2 g/dl. The solution was heated to 70° C. and stirred for 30 minutes to dissolve the sample. The resulting solution was cooled in a water bath at 15±1° C., and then allowed to stand at room temperature to obtain a test solution.

[Measurement of Efflux Time t0 of Solvent (Blank Test)]

Measurement was conducted with a capillary (Ubbelohde type tube for measuring viscosity) type automatic viscosity measuring device (model: AVL-2C, manufactured by Asahi Kasei Technosystem Corporation). The Ubbelohde type tube had a diameter at a capillary portion of 0.77 mm (±2%). The temperature of the thermostatic bath of the automatic viscosity measuring device as well as the test temperature was set to 30±0.1° C. A mixed solvent of phenol/1,1,2,2-tetrachloroethane (60/40: mass ratio) was placed in the tube for measuring viscosity. The tube for measuring viscosity was set in the thermostatic bath and controlled at 30±0.1° C. for 10 minutes. After that, the test was started and the efflux time (second) of the mixed solvent was measured twice in succession. The average of the measurement values of two times was determined as a solvent efflux time t0 (second).

[Measurement of Efflux Time t1 of Test Solution]

Measurement was conducted with the same automatic viscosity measuring device as used in the measurement of t0. Since the tube for measuring viscosity was not allowed to be changed, the same tube as in the measurement of t0 was used. The temperature of the thermostatic bath of the automatic viscosity measuring device as well as the test temperature was set to 30±0.1° C. The tube was washed with the test solution. The test solution was then placed in the tube. The tube was set in the thermostatic bath and controlled at 30±0.1° C. for 10 minutes. After that, the test was started, and the efflux time of the mixed solvent (second) was measured twice in succession. The average of the measurement values of two times was determined as a solvent efflux time t1 (s).

[Calculation of Reduced Viscosity]

The reduced viscosity (dl/g) was calculated according to the following equation.

$$\text{Reduced viscosity } \eta sp/c = (t1/t0 - 1)/c$$

t1 (second): efflux time of test solution
t0 (second): efflux time of solvent
c (0.2 g/dl): concentration of test solution

(2) Retention Rate of Reduced Viscosity After Heat Treatment

A test piece with the size of "5 cm×5 cm×thickness of three-dimensional network structure" was cut out from the three-dimensional network structure before heat treatment. The test piece was sealed in a moisture-proof and lightshielded bag, and stored at room temperature to obtain a test piece A before heat treatment.

A test piece with the size of "10 cm×10 cm×thickness of three-dimensional network structure" was cut out from the three-dimensional network structure. The test piece was placed in a thermo-hygrostat set to an internal environment of a temperature of 80° C. and a relative humidity of 90 RH % to be heat treated for 240 hours. After that, the test piece was taken out from the thermo-hygrostat and cooled at room temperature for 1 hour. The test piece after heat treatment was determined as a test piece B.

"The reduced viscosity (reduced viscosity A) of the resin composition of the three-dimensional network structure before heat treatment" was measured with the test piece A by the measurement method of reduced viscosity described in above (1).

Similarly, "the reduced viscosity (reduced viscosity B) of the resin composition of the three-dimensional network structure after heat treatment" was measured with the test piece B by the measurement method of reduced viscosity described in above (1).

The reduced viscosity A and the reduced viscosity B were measured on the same day with the same automatic viscosity measuring device and the same tube for measuring viscosity.

The retention rate of reduced viscosity after heat treatment was calculated according to the following equation.

$$\text{Retention rate of reduced viscosity after heat treatment } (\%) = (B/A) \times 100$$

(3) Phosphorus Content in Three-Dimensional Network Structure

A sample was taken from the three-dimensional network structure at an weigh of 0.2 g. After the addition of 10 ml of concentrated nitric acid, the sample was subjected to wet acid digestion with a microwave decomposition unit (model: Multiwave PRO, manufactured by Anton Paar). Specifically, the sample was heated up by 700 W of power supply for 10 minutes and then held for 50 minutes by 700 W of power supply to be made into a solution. After that, the solution was cooled to 40° C. and defined as a sample solution. The sample solution was diluted with ultrapure water to 50 ml, and the resulting pretreated solution was measured with a high-frequency inductively coupled plasma optical emission analyzer (Spectroblue, manufactured by Hitachi High-Tech Science Corporation). The phosphorus content (mg/l) in the pretreated solution was calculated from the calibration curve made in advance, and the content was determined as C (mg/l). Next, a blank solution prepared by diluting 10 ml of concentrated nitric acid with ultrapure water to 50 ml was measured with the same analyzer, then the phosphorus content (mg/l) in the blank solution was calculated from the calibration curve made in advance, and the content was determined as D (mg/l).

The phosphorus content in the three-dimensional network structure (ppm: mass standard) was calculated according to the following equation.

$$\text{Phosphorus content in the three-dimensional network structure (ppm: mass standard)} = (C-D) \times 50/0.2$$

The contend of zinc, an alkali metal, and an alkaline earth metal can be determined by the same procedure. The content of silicon can be determined by the following method (4).

(4) Silicon Content in Three-Dimensional Network Structure

A sample was taken from the three-dimensional network structure at an weigh of 0.2 g. The sample was weighed in a platinum crucible and precarburized under the temperature up to 400° C. on a hot plate. Then, the sample was carbonized at 550° C. for 8 hours with an electric furnace (model: FO610, manufactured by Yamato Scientific Co., Ltd.). After the carbonization, 5 ml of 5% sodium carbonate aqueous solution was added, and then the sample was heated on a hot plate until water was completely volatilized. The sample was then subjected to alkaline melting using a burner. Ultrapure water was added to the obtained white residue and the residue was heated on a hot plate. After confirming that the salt was completely dissolved, 5 ml of 6N hydrochloric acid was added, and the resulting solution was diluted with ultrapure water to 25 ml to obtain a pretreated solution. The pretreated solution was then measured with a high-frequency inductively coupled plasma optical emission analyzer (Spectroblue, manufactured by Hitachi High-Tech Science Corporation). The silicon content in the pretreated solution was calculated and determined as E (mg/l). Then a blank solution was prepared by adding 5 ml of 6N hydrochloric acid to 5 ml of 5% sodium carbonate aqueous solution, and diluting the mixed solution with ultrapure water to 25 ml. The blank solution was measured with the same analyzer, then the silicon content (mg/l) in the blank solution was calculated from the calibration curve made in advance. The silicon content was determined as F (mg/l).

The content of silicon in the three-dimensional network structure (ppm: mass standard) was calculated according to the following equation.

$$\text{Silicon content in three-dimensional network structure (ppm: mass standard)} = (E-F) \times 25/0.2$$

(5) Melting Temperature (Tm)

A pellet of the thermoplastic elastomer was sliced thinly and placed and enclosed in sample pan. Then, measurement was conducted at a temperature rise rate of 20° C./min with a differential scanning calorimeter (model: Q200, manufactured by TA Instruments). From the obtained endothermic/exothermic curve, the endothermic peak (melting peak) temperature in melting of crystals was calculated and determined as a melting point of the thermoplastic elastomer.

(6) Acid Value

The acid value of the polyester-based thermoplastic elastomer was quantified with a proton-type nuclear magnetic resonance device (model: AVANCE NEO-500, manufactured by Bruker) by $^1$H-NMR measurement at a resonant frequency of 500 MHz. The measurement solution was prepared as follows.
<Measurement i>
A sample weighed to 10 to 20 mg was dissolved in 0.12 ml of deuterochloroform/hexafluoroisopropanol (1/1: volume ratio), and then 0.48 ml of deuterochloroform was added to the resulting solution. The mixed solution was stirred well and an NMR tube was filled with the solution to conduct $^1$H-NMR measurement.
<Measurement ii>
To the solution after measurement i, 25 μl of a deuterochloroform solution adjusted to have a triethylamine concentration of 0.2 mol/L was added, and the resulting solution was subjected to $^1$H-NMR measurement again. Deuterochloroform was used as a lock solvent and the number of integration was 128 times in each measurement.

<Measurement of Acid Value>
The measurement of acid value was conducted as follows. When the peak at 7.27 ppm was for chloroform, the following peaks were identified as follows. In measurements i and ii, the peak at 8 ppm was for terephthalic acid (a), the peak at 2 ppm was for 1,4-butanediol (b), and the peak at 3.5 ppm was for polytetramethylene glycol (c). The peak at 7.87 to 7.96 ppm in measurement i was a satellite peak of terephthalic acid (d) and the peak at 7.87 to 7.96 ppm in measurement ii was a satellite peak of terephthalic acid terminus and terephthalic acid (e). The acid value was calculated from the following equation, where a to e in parentheses were the integrated values of each peak.

$$(f) = (a/4 \times 132) + (b/4 \times 88) + (c/4 \times 72)$$

Acid value (eq/ton) = $((e-d)/2 \times 1000000)/(f)$
Unit: meq/kg (an average when n=2)

(7) Thickness and Apparent Density of Three-Dimensional Network Structure

From the three-dimensional network structure, four test pieces each having the size of "10 cm×10 cm×thickness of three-dimensional network structure" were cut out. The test pieces were allowed to stand with no load at room temperature for 24 hours. After that, the height (mm) of each test piece (in the thickness direction) was measured with a thickness gauge (model: FD-80N, manufactured by Kobunshi Keiki Co., Ltd.,). The average thickness of the four test pieces was determined as a thickness of the three-dimensional network structure.

Weight W (g) of each test piece was measured with an electronic balance, and the apparent density (g/cm$^3$) of each sample was calculated according to the following equation. The average of the apparent density (g/cm$^3$) of the four test pieces was determined as an apparent density of the three-dimensional network structure.

$$\text{Apparent density (g/cm}^3) = W/(10 \times 10 \times \text{height of test piece}/10)$$

(8) Fiber Diameter of Three-Dimensional Network Structure

From the three-dimensional network structure, a test piece with the size of "10 cm×10 cm×thickness of three-dimensional network structure" was cut out. Then, a filament was collected at a length of about 5 mm from each of ten points of the obtained test piece. The diameter of each fiber was measured after adjusting an optical microscope to appropriate magnification and focusing the microscope on a measuring point. The average of the diameters from the ten points was determined as a diameter (mm) of the three-dimensional network structure.

Example 1

(1) Production of Polyester-Based Thermoplastic Elastomer
To produce a polyester-based thermoplastic elastomer, dimethyl terephthalate (DMT), 1,4-butanediol (1,4-BD), and polytetramethylene glycol (PTMG, average molecular weight: 1000) were charged together with small amount of catalyst, and subjected to transesterification by a conventional method. The resultant was then subjected to polycondensation with increasing temperature under reduced pressure and then pelletized to produce a polyester-ether block copolymer elastomer. The elastomer was produced in a conventional manner in which a method to reduce thermal history between polymerization by polycondensation reaction and pelletizing was not involved.

In Table 1, a monomer composition, a melting point, an acid value, and reduced viscosity of the obtained polyester-based thermoplastic elastomer (A-1) are shown.

The following two methods capable of decreasing thermal history were not used in the melt extrusion.

(a) the amount of shear applied per discharge was 3 or more and 200 or less (Q/N, unit: cm³/rev).

Q: discharge rate per minute of resin from the nozzle (cm³/min).

TABLE 1

| Name of resin | Hard segment | | Soft Segment | | Amount of soft segment (parts by mass) | Resin characteristics | | |
|---|---|---|---|---|---|---|---|---|
| | Acid component | Glycol component | Component | Number average molecular weight | | Melting temperature (° C.) | Acid value (meq/kg) | Reduced viscosity (dl/g) |
| A-1 | DTM | 1,4 BD | PTMG | 1000 | 43 | 190 | 39 | 1.89 |

(2) Production of Resin Composition for Forming Three-Dimensional Network Structure The obtained polyester-based thermoplastic elastomer (A-1) at 99.495% by mass, fine powder of phosphate glass (type: E74543, ISHIZUKA GLASS CO., LTD.) at 0.005% by mass of, and phenol-based antioxidant at 0.500% by mass were mixed. The mixture was then melt extruded from a twin-screw extruder, cooled, pelletized, and dried to give a resin composition which was a raw material of the three-dimensional network structure.

The phosphate glass used in the experiment had the following composition.

$P_2O_5$: 37 mol %, $SiO_2$: 7 mol %, $B_2O_3$: 12 mol %, ZnO: 35 mol %, $Al_2O_3$: 9 mol %

(3) Production of Three-Dimensional Network Structure

In order to produce the three-dimensional network structure was prepared a nozzle which had (i) an effective surface with lengths in the width direction of 1120 mm and in the thickness direction of 34.5 mm, and (ii) triple bridge orifices, each of which had an outer diameter of 5.0 mm and ability to form a hollow cross-section, positioned in a staggered arrangement at 8 mm of inter-hole spacing. The resin composition including 0.005% by mass of the phosphate glass and the polyester-based thermoplastic elastomer (A-1) as a base resin was discharged downward from the nozzle at a spinning temperature of 240° C. and a discharge rate from a single hole of 1.5 g/min. Then, 23 cm below the nozzle surface, cooling water was disposed through a cooling space with an ambient temperature of 25 to 35° C. without cooling air, and a pair of take-up conveyors each equipped with an endless net having a width of 150 cm and made of stainless was disposed. The conveyors were disposed in parallel to each other with the width of opening portion between the conveyors (the distance between the endless nets) of 25 mm, so as to be partially positioned above the surface of the water. The molten resin was discharged as filaments and curled to form loops, and the three-dimensional network structure was formed by fusing the contact portions of the loops. The three-dimensional network structure in a melt state was sandwiched at both faces by the take-up conveyors, drawn into the cooling water at a take-up speed of 0.9 m/min to be solidified, and the three-dimensional network structure having flattened both sides was obtained. The three-dimensional network structure was cut into a prescribed size and dried/heated at 105° C. with hot air for 30 minutes. Thus obtained three-dimensional network structure had characteristics shown in Table 3. The three-dimensional network structure had retention rate of reduced viscosity after heat treatment of 68%, and thus had high hydrolysis resistance.

N: screw rotation number to discharge resin in an amount defined by Q (rev/min).

(b) passage time in piping was 1 or more and 30 or less (V/Q, unit: min).

V: total volume of inner space of piping and the nozzle, in which at the inlet of the inner space the resin was extruded from an extruder and at the outlet of the inner space the resin was discharged from nozzle surface.

Q: discharge rate per minute of resin from a nozzle (cm³/min)

Example 2

The polyester-based thermoplastic elastomer (A-1) at 99.49% by mass, the same fine powder of phosphate glass as Example 1 at 0.01% by mass, and phenol-based antioxidant at 0.50% by mass were mixed. The mixture was then melt extruded from a twin-screw extruder, cooled, pelletized, and dried to give a resin composition which was a raw material of the three-dimensional network structure.

From the obtained resin composition, the three-dimensional network structure was obtained in the same manner as Example 1. Thus obtained three-dimensional network structure had characteristics shown in Table 3. The three-dimensional network structure had a retention rate of reduced viscosity after heat treatment of 70%, and thus had high hydrolysis resistance.

Example 3

The polyester-based thermoplastic elastomer (A-1) at 99.45% by mass, the same fine powder of phosphate glass as Example 1 at 0.05% by mass, and phenol-based antioxidant at 0.50% by mass were mixed. The mixture was then melt extruded from a twin-screw extruder, cooled, pelletized, and dried to give a resin composition which was a raw material of the three-dimensional network structure.

From the obtained resin composition, the three-dimensional network structure was obtained in the same manner as Example 1. Thus obtained three-dimensional network structure had characteristics shown in Table 3. The three-dimensional network structure had a retention rate of reduced viscosity after heat treatment of 74%, and thus had high hydrolysis resistance.

Example 4

The polyester-based thermoplastic elastomer (A-1) at 99.4% by mass, the same fine powder of phosphate glass as Example 1 at 0.1% by mass, and phenol-based antioxidant at 0.5% by mass were mixed. The mixture was then melt extruded from a twin-screw extruder, cooled, pelletized, and dried to give a resin composition which was a raw material of three-dimensional network structure.

From the obtained resin composition, the three-dimensional network structure was obtained in the same manner as Example 1. Thus obtained three-dimensional network structure had characteristics shown in Table 3. The three-dimensional network structure had a retention rate of reduced viscosity after heat treatment of 76%, and thus had high hydrolysis resistance.

Example 5

The polyester-based thermoplastic elastomer (A-1) at 99.0% by mass, the same fine powder of phosphate glass as Example 1 at 0.5% by mass, and phenol-based antioxidant at 0.5% by mass were mixed. The mixture was then melt extruded from a twin-screw extruder, cooled, pelletized, and dried to give a resin composition which was a raw material of the three-dimensional network structure.

From the obtained resin composition, the three-dimensional network structure was obtained in the same manner as Example 1. Thus obtained three-dimensional network structure had characteristics shown in Table 3. The three-dimensional network structure had a retention rate of reduced viscosity after heat treatment of 82%, and thus had high hydrolysis resistance.

Example 6

The polyester-based thermoplastic elastomer (A-1) at 98.5% by mass, the same fine powder of phosphate glass as Example 1 at 1.0% by mass, and phenol-based antioxidant at 0.5% by mass were mixed. The mixture was then melt extruded from a twin-screw extruder, cooled, pelletized, and dried to give a resin composition which was a raw material of the three-dimensional network structure.

From the obtained resin composition, the three-dimensional network structure was obtained in the same manner as Example 1. Thus obtained three-dimensional network structure had characteristics shown in Table 3. The three-dimensional network structure had a retention rate of reduced viscosity after heat treatment of 86%, and thus had high hydrolysis resistance.

Example 7

The polyester-based thermoplastic elastomer (A-1) at 99.4% by mass, the same fine powder of phosphate glass as From the obtained resin composition, the three-dimensional network structure was obtained in the same manner as Example 1. Thus obtained three-dimensional network structure had characteristics shown in Table 3. The three-dimensional network structure had a retention rate of reduced viscosity after heat treatment of 75%, and thus had high hydrolysis resistance.

Comparative Example 1

The polyester-based thermoplastic elastomer (A-1) at 99.5% by mass and phenol-based antioxidant at 0.5% by mass were mixed. The mixture was then melt extruded from a twin-screw extruder, cooled, pelletized, and dried to give a resin composition which is a raw material of the three-dimensional network structure.

From the obtained resin composition, the three-dimensional network structure was obtained in the same manner as Example 1. Thus obtained three-dimensional network structure had characteristics shown in Table 3. Since the three-dimensional network structure did not contain phosphate glass, the structure had a retention rate of reduced viscosity after heat treatment of 62%, resulting in inferior hydrolysis resistance.

Comparative Example 2

(1) Production of Thermoplastic Elastomer

To produce polyester-based thermoplastic elastomer, dimethyl terephthalate (DMT) and 1,4-butanediol (1,4-BD) were charged together with small amount of catalyst, and subjected to transesterification by a conventional method. Then, polytetramethylene glycol (PTMG) was added to the resultant and the mixture was subjected to polycondensation with increasing temperature under reduced pressure to give a polyester-ether block copolymer elastomer. To the elastomer, 1% by mass of a phenol-based antioxidant was added and kneaded. The method capable of decreasing thermal history after polymerization more effectively than before was used. The resultant was pelletized and dried at 50° C. for 48 hours to produce the thermoplastic elastomer (A-2).

In Table 2, a monomer composition, a melting point, an acid value, and reduced viscosity of the obtained polyester-based thermoplastic elastomer (A-2) are shown. The polyester-based thermoplastic elastomer (A-2) had lower acid value compared to that of the polyester-based thermoplastic elastomer (A-1).

TABLE 2

| | | | | | | Resin characteristics | | |
|---|---|---|---|---|---|---|---|---|
| | Hard segment | | Soft Segment | | Amount of soft | Melting | | Reduced |
| Name of resin | Acid component | Glycol component | Component | Number average molecular weight | segment (parts by mass) | temperature (° C.) | Acid value (meq/kg) | viscosity (dl/g) |
| A-2 | DTM | 1,4 BD | PTMG | 1000 | 43 | 192 | 19 | 1.86 |

Example 1 at 0.1% by mass, and phenol-based antioxidant at 0.5% by mass were mixed. The mixture was then melt extruded from a twin-screw extruder, cooled, pelletized, and dried to give a resin composition which was a raw material of the three-dimensional network structure.

(2) Production of Three-Dimensional Network Structure

In order to produce the three-dimensional network structure was prepared a nozzle which had (i) an effective surface with lengths in the width direction of 1120 mm and in the thickness direction of 64 mm, and (ii) triple bridge orifices, each of which had an outer diameter of 5.0 mm and ability to form a hollow cross-section, positioned in a staggered arrangement at 8 mm of inter-hole spacing.

In Comparative Example 2, the method described in Example 1 which was capable of reducing thermal history in spinning by melt extrusion was used.

The resin composition of the polyester-based thermoplastic elastomer was discharged downward from the nozzle at a melting temperature of 240° C. and a discharge rate from a single hole (Q) of 3.2 g/min. The screw rotation speed (N) was set to 70 rpm, the amount of shear applied per discharge (Q/N) was set to 48.7 cm³/rev, and the passage time in piping was set to 1 min. Before the discharge of the resin composition, 33 cm below the nozzle surface, cooling water was disposed.

A pair of take-up conveyors each equipped with an endless net having a width of 150 cm and made of stainless was disposed in parallel to each other with the width of opening portion between the conveyors (the distance between the endless nets) of 50 mm, so as to be partially positioned above the surface of the water. The molten resin was discharged in the opening portion between the nets of the conveyers above the water surface. The resin discharged as filaments were curled to form loops, and the three-dimensional network structure was formed by fusing the contact portions of the loops. The three-dimensional network structure in a melt state was sandwiched at both faces by the take-up conveyors, drawn into the cooling water at a take-up speed of 2.0 m/min to be solidified, and the three-dimensional network structure having flattened both sides was obtained. The three-dimensional network structure was cut into a prescribed size and dried/heated at 110° C. with hot air for 15 minutes.

Thus obtained three-dimensional network structure had characteristics shown in Table 3. The three-dimensional network structure had a retention rate of reduced viscosity after heat treatment of 62% and had inferior hydrolysis resistance.

TABLE 3

| Item | | | Example 1 | Example 2 | Example 3 | Example 4 | Example 5 | Example 6 |
|---|---|---|---|---|---|---|---|---|
| Resin composition | Thermoplastic elastomer | Type | A-1 | A-1 | A-1 | A-1 | A-1 | A-1 |
| | | Blending ratio (% by mass) | 99.495 | 99.49 | 99.45 | 99.4 | 99.0 | 98.5 |
| | Phosphate glass | Type | E74543 | E74543 | E74543 | E74543 | E74543 | E74543 |
| | | Blending ratio (% by mass) | 0.005 | 0.01 | 0.05 | 0.1 | 0.5 | 1.0 |
| | Phenol-based antioxidant | Blending ratio (% by mass) | 0.500 | 0.50 | 0.50 | 0.5 | 0.5 | 0.5 |
| Spinning conditions | Spinning temperature | (° C.) | 240 | 240 | 240 | 240 | 240 | 240 |
| | Discharge rate from a single hole | (g/min) | 1.5 | 1.5 | 1.5 | 1.5 | 1.5 | 1.5 |
| | Take-up speed | (m/min) | 0.9 | 0.9 | 0.9 | 0.9 | 0.9 | 0.9 |
| | Distance between nozzle face and cooling water | (cm) | 23 | 23 | 23 | 23 | 23 | 23 |
| Characteristics | Apparent density | (g/cm³) | 0.045 | 0.045 | 0.045 | 0.045 | 0.045 | 0.045 |
| | Thickness | (mm) | 25 | 25 | 25 | 25 | 25 | 25 |
| | Fiber diameter | (mm) | 0.6 | 0.6 | 0.6 | 0.6 | 0.6 | 0.6 |
| | Reduced viscosity before heat treatment | (dl/g) | 1.84 | 1.82 | 1.83 | 1.84 | 1.82 | 1.82 |
| | Reduced viscosity after heat treatment | (dl/g) | 1.26 | 1.28 | 1.86 | 1.40 | 1.49 | 1.56 |
| | Retention rate of reduced viscosity after heat treatment | (%) | 68 | 70 | 74 | 76 | 82 | 86 |
| | Phosphorus content in three-dimensional network structure | (ppm: on a mass basis) | 11 | 22 | 11.0 | 220 | 11.00 | 2200 |
| | Silicon content in three-dimensional network structure | (ppm: on a mass basis) | 1 | 2 | 10 | 19 | 95 | 190 |
| | Amount of phosphorus atoms/amount of silicon atoms (molar ratio) | (—) | 11.6 | 11.6 | 11.6 | 11.6 | 11.6 | 11.6 |

| Item | | | Example 7 | Comparative Example 1 | Comparative Example 2 |
|---|---|---|---|---|---|
| Resin composition | Thermoplastic elastomer | Type | A-1 | A-1 | A-2 |
| | | Blending ratio (% by mass) | 99.4 | 99.5 | 99 |
| | Phosphate glass | Type | E74518 | — | — |
| | | Blending ratio (% by mass) | 0.1 | — | — |
| | Phenol-based antioxidant | Blending ratio (% by mass) | 0.5 | 0.5 | 1 |
| Spinning conditions | Spinning temperature | (° C.) | 240 | 240 | 240 |
| | Discharge rate from a single hole | (g/min) | 1.5 | 1.5 | 3.2 |
| | Take-up speed | (m/min) | 0.9 | 0.9 | 2.5 |
| | Distance between nozzle face and cooling water | (cm) | 23 | 23 | 33 |
| Characteristics | Apparent density | (g/cm³) | 0.045 | 0.045 | 0.037 |
| | Thickness | (mm) | 25 | 25 | 48 |
| | Fiber diameter | (mm) | 0.6 | 0.6 | 0.8 |
| | Reduced viscosity before heat treatment | (dl/g) | 1.82 | 1.83 | 1.85 |
| | Reduced viscosity after heat treatment | (dl/g) | 1..56 | 1.13 | 1.15 |

TABLE 3-continued

| | | | | |
|---|---|---|---|---|
| Retention rate of reduced viscosity after heat treatment | (%) | 75 | 62 | 62 |
| Phosphorus content in three-dimensional network structure | (ppm: on a mass basis) | 290 | — | — |
| Silicon content in three-dimensional network structure | (ppm: on a mass basis) | 21 | — | — |
| Amount of phosphorus atoms/amount of silicon atoms (molar ratio) | (—) | 18.8 | — | — |

INDUSTRIAL APPLICABILITY

The three-dimensional network structure of the present invention has high hydrolysis resistance and is suitable for long-term use as a cushion material of office chairs, furniture, sofas, bedding such as beds, seats of vehicles such as trains, automobiles, two-wheeled vehicles, child safety seats, and baby buggies, shock-absorbing mats such as floor mats and members for preventing collision and nipping.

The invention claimed is:

1. A three-dimensional network structure comprising a three-dimensional random loop shaped and bonded structure comprising a linear continuous fiber, wherein the linear continuous fiber comprises a resin composition, and the resin composition comprises a polyester-based thermoplastic elastomer and a phosphate glass, and the molar ratio of phosphorus atoms to silicon atoms (P/Si) in the phosphate glass is 1 to 15.

2. The three-dimensional network structure according to claim 1, wherein the phosphate glass contains $P_2O_5$, $SiO_2$, ZnO, and at least one selected from the group consisting of an alkali metal oxide and an alkaline earth metal.

3. The three-dimensional network structure according to claim 2, wherein the phosphate glass contains an alkaline earth metal oxide containing the alkaline earth metal.

*    *    *    *    *